R. PECK.
Turning Lathe.
No. 19,472.
Patented Feb. 23, 1858.
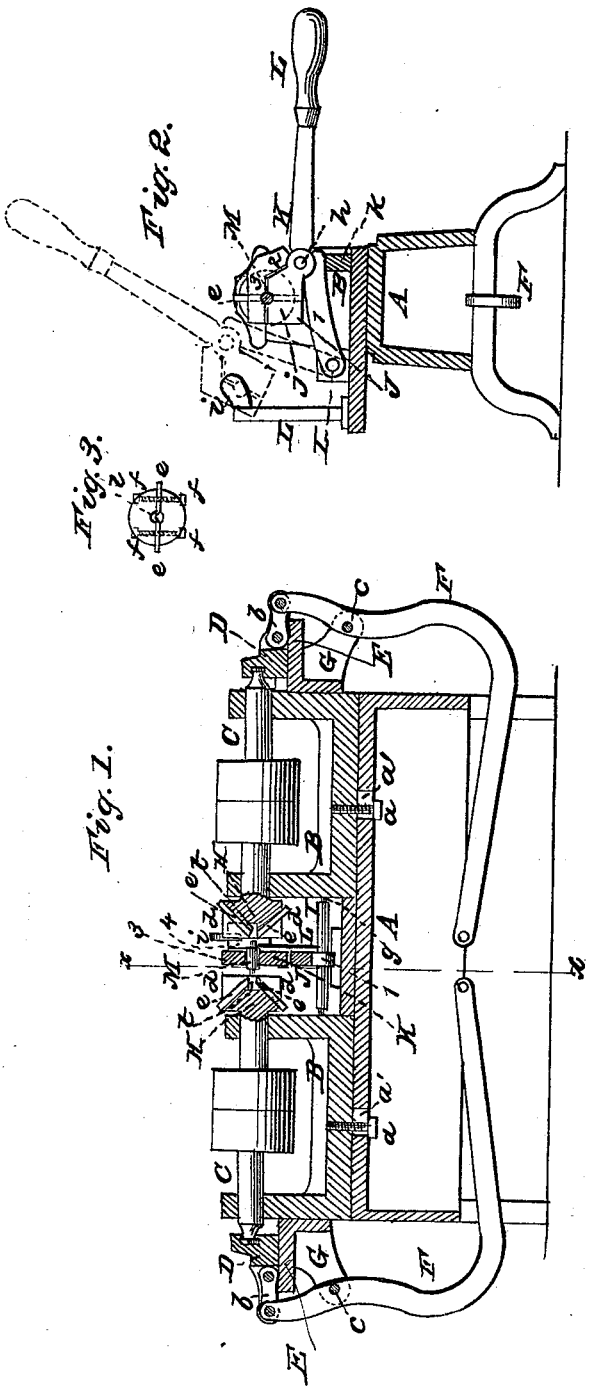

UNITED STATES PATENT OFFICE.

RUSSEL PECK, OF BRISTOL, CONNECTICUT, ASSIGNOR TO HIMSELF, AND G. H. WOOSTER, OF NEW YORK, N. Y.

LATHE FOR CUTTING TENONS FOR CLOCK-MOVEMENTS.

Specification of Letters Patent No. 19,472, dated February 23, 1858.

*To all whom it may concern:*

Be it known that I, RUSSEL PECK, of Bristol, in the county of Hartford and State of Connecticut, have invented a new and useful implement or device for cutting the tenons on metal rods used for connecting the plates or frames of clock-movements and technically termed "pillars;" and I do hereby declare that the following is a full, clear, and exact description of the same, reference being had to the annexed drawings, making a part of this specification, in which—

Figure 1, is a longitudinal vertical section of my improvement; the plane of section passing through the center. Fig. 2 is a transverse vertical section of ditto; $(x)$ $(x)$, Fig. 1 showing the plane of section. Fig. 3 is a detached front view of one of the cutter heads.

Similar letters of reference indicate corresponding parts in the several figures.

My invention consists in the employment or use of two cutter heads attached to vibrating mandrels so arranged that both operate or move simultaneously; and using in connection with said cutter heads, thus arranged, a clamp peculiarly constructed, and a gage, the whole being arranged as will be hereinafter fully shown and described whereby the tenons may be cut with great facility and in a perfect manner.

To enable those skilled in the art to fully understand and construct my invention I will proceed to describe it.

A represents a bed which may be of cast iron. This bed has two cast iron heads B, B, secured upon it, said heads being attached to the bed by set screws $(a)$ which pass through slots $(a')$ in the bed so that the heads may be adjusted at varying distances apart as circumstances may require. In each head B a mandrel C is fitted. These mandrels are allowed to slide longitudinally in the heads B. The outer ends of the mandrels C are fitted in the slides D, which are placed and work in guide boxes E, attached one to the outer end of each head B as shown clearly in Fig. 1. To the outer end of each slide D a lever F is attached by a link $(b)$. These levers F work on fulcrum pins $(c)$ which pass through projecting bars G attached to the outer sides of the heads B. The levers F are of curved or bent form as shown clearly in Fig. 1, and their lower ends may be both attached to a treadle or mill not represented.

To the inner end of each mandrel C a cutter head H is attached. These cutter heads are of cylindrical form and have each two slots $(d)$ cut in them at opposite sides of their centers, the bottoms of the slots having oblique positions relatively with the mandrels C.

Within each slot $(d)$ a cutter $(e)$ is placed, these cutters are secured in proper position by set screws $(f)$ see Fig. 3. It will be seen by referring to Fig. 1 that the two cutters of each cutter head are placed in oblique positions relatively with their mandrels, the cutters gradually approaching each other from their outer to their inner or cutting edges as shown in Fig. 1.

I represents an arbor or shaft the ends of which are secured between centers $(g)$ $(g)$ on the bed A. To the center of the arbor or shaft I, a bent bar J is attached. This bar has three portions (1) (2) (3). The end of the part or portion (1) is attached to the arbor or shaft I; the part or portion (2) is bent at right angles to the part (1) and the part (3) is bent at right angles with the part (2) and is parallel or nearly so with the part (1). This bar J although described as being bent, may be cut or swaged from a metal plate, or may be cast of the desired form.

K represents a bar which is pivoted to the part (2) of the bar J and near its junction with the part (1) as shown at $(h)$ Fig. 2. The outer end of the bar K has a handle L placed on it and the inner end or jaw $(j)$ plays between the two parts (1) (3) of the bar I I. See more particularly Fig. 2.

To the bed A an upright L is attached. This upright is in line with the bar K, and the upper end of the upright has a lateral projection (4) atached to which a gage $(i)$ is secured.

The pillars M are cut from wire of the desired length and are placed one at a time between the jaw $(j)$ of the bar K and the part (3) of the bar J which form a clamp, the "pillars" fitting in notches or recesses made one in the jaw $(j)$ and the other in the part (3). One end of the pillars is brought in contact with the gage $(i)$ which is so set as to cause the pillars to be grasped directly at the centers of the clamps. The outer end of the bar K is then depressed, the bar J bearing or resting on a block (*k*) on the bed A and the ends of the pillar M are, when the bar K is in this position, directly in line with the centers of the cutter heads H, H. The levers F, F, are then actuated simultaneously by means of a foot treadle or any equivalent device and the cutter heads H, H, will advance toward the ends of the pillar which ends will have tenons cut on them by the cutters (*e*) the ends of the pillars or tenons passing in apertures (*l*) in the centers of the cutter heads.

By the above implement the tenons are cut on the ends of the "pillars" and lock work with great rapidity and in a perfect manner. The machine has been practically tested and it operates perfectly.

I do not claim any of the within described parts separately, or irrespective of the arrangement as herein shown, for they or their equivalents, when separately considered, have been used for analogous purposes;—but,

Having thus described my invention, what I claim as new, and desire to secure by Letters Patent, is:

The clamp formed of the bars J, K, when arranged and combined with the mandrels C, C, and gage I, substantially as and for the purposes herein set forth.

RUSSEL PECK.

Witnesses:
WM. R. RICHARDS,
CHARLES A. ROPER.